(12) United States Patent
Nakao et al.

(10) Patent No.: US 11,010,947 B2
(45) Date of Patent: May 18, 2021

(54) INFORMATION PROCESSING SYSTEM AND INFORMATION PROCESSING APPARATUS

(71) Applicant: NTT DOCOMO, INC., Tokyo (JP)

(72) Inventors: Naoyuki Nakao, Tokyo (JP); Satoshi Omiya, Tokyo (JP); Yoshikatsu Kanemaru, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 80 days.

(21) Appl. No.: 16/477,584

(22) PCT Filed: Dec. 25, 2017

(86) PCT No.: PCT/JP2017/046428
§ 371 (c)(1),
(2) Date: Jul. 12, 2019

(87) PCT Pub. No.: WO2018/135246
PCT Pub. Date: Jul. 26, 2018

(65) Prior Publication Data
US 2020/0126279 A1 Apr. 23, 2020

(30) Foreign Application Priority Data
Jan. 23, 2017 (JP) .............................. JP2017-009643

(51) Int. Cl.
*G06T 11/60* (2006.01)
*G06K 9/00* (2006.01)

(52) U.S. Cl.
CPC .......... *G06T 11/60* (2013.01); *G06K 9/00302* (2013.01)

(58) Field of Classification Search
None
See application file for complete search history.

(56) References Cited

U.S. PATENT DOCUMENTS 8,564,614 B2 * 10/2013 Muraki .............. H04N 5/23293
345/619
8,682,103 B2 * 3/2014 Habuka ................ H04N 1/3876
382/284

(Continued)

FOREIGN PATENT DOCUMENTS

CN 103778376 A 5/2014
EP 2843625 A1 3/2015

(Continued)

OTHER PUBLICATIONS

Notice of Reasons of Refusal issued in corresponding Japanese Patent Application No. 2018-563240, dated Mar. 23, 2020, 7 pages.

(Continued)

*Primary Examiner* — Jiangeng Sun
(74) *Attorney, Agent, or Firm* — MKG, LLC

(57) ABSTRACT

Provided is technology that enables users to feel more enjoyment than ever. Information processing apparatus recognizes an image captured by display apparatus. Information processing apparatus instructs display apparatus to composite, with the captured image, a first composite image that varies according to an image recognition result and further composite a second composite image at a predetermined position in the first composite image. For example, if landscape is captured by display apparatus, a character image representing a running person is displayed as first composite image according to the landscape. In first composite image, region corresponding to the head of the person is blank, and when a user captures their face using display apparatus, an image of the user's face is composited as second composite image in region corresponding to the head in the first composite image.

7 Claims, 5 Drawing Sheets

(56) References Cited

U.S. PATENT DOCUMENTS

| | | | | |
|---|---|---|---|---|
| 9,381,426 | B1* | 7/2016 | Hughes | H04L 67/06 |
| 2002/0060648 | A1* | 5/2002 | Matsui | G06F 3/0304 |
| | | | | 345/8 |
| 2004/0238718 | A1* | 12/2004 | Washisu | G06T 5/50 |
| | | | | 250/201.2 |
| 2012/0268552 | A1 | 10/2012 | Choi et al. | |
| 2015/0172560 | A1 | 6/2015 | Baek | |

FOREIGN PATENT DOCUMENTS

| | | |
|---|---|---|
| JP | 2003-274396 A | 9/2003 |
| JP | 2007-300562 A | 11/2007 |
| JP | 2011-070623 A | 4/2011 |
| JP | 2012-065263 A | 3/2012 |

OTHER PUBLICATIONS

International Search Report issued in corresponding PCT Application No. PCT/JP2017/046428, dated Mar. 27, 2018, 4 pages.
Extended European Search Report issued in corresponding European Patent Application No. 17892271.2, dated Dec. 6, 2019.
First Notification of Office Action issued in corresponding Chinese Patent Application No. 201780084122.5, dated Jul. 3, 2020, 16 pages.
Office Action issued in corresponding Chinese Patent Application No. 201780084122.5, dated Feb. 3, 2021, 14 pages.

\* cited by examiner

| RECOGNI-TION TYPE | IMAGE RECOGNITION RESULT | | FIRST COMPOSITE IMAGE ID | DISPLAY POSITION OF FIRST COMPOSITE IMAGE |
| --- | --- | --- | --- | --- |
| | CATEGORY | PROPER NOUN | | |
| CATEGORIZA-TION | BRIDGE | – | C001 | ABSOLUTE COORDINATES X1,Y1 |
| | BUILDING | – | C002 | ABSOLUTE COORDINATES X2,Y2 |
| | ... | ... | ... | ... |
| OBJECT DETECTION | BUILDING | CLOCK TOWER | C020 | RELATIVE COORDINATES x1,y1 |
| | AUTOMOBILE | – | C021 | RELATIVE COORDINATES x2,y2 |
| | CARD | POINT CARD OF A COMPANY | C022 | RELATIVE COORDINATES x3,y3 |
| | | | C023 | RELATIVE COORDINATES x4,y4 |
| | ... | ... | ... | ... |

FIG. 4

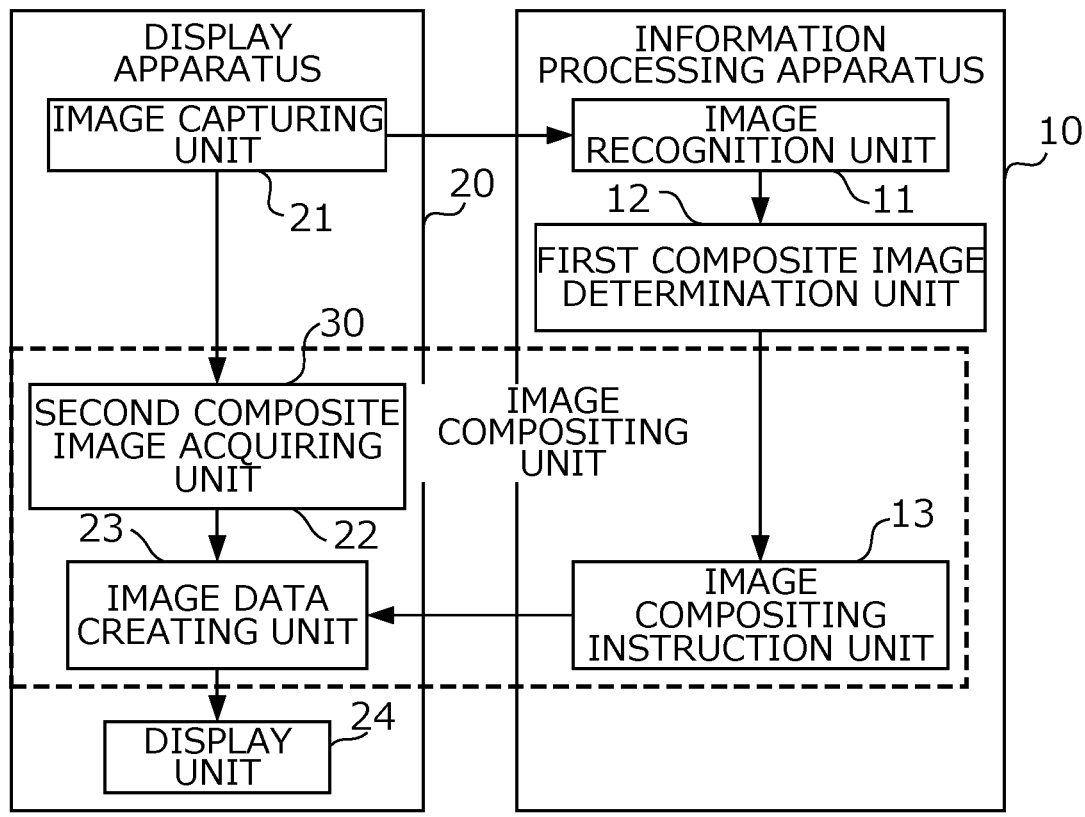

FIG. 5

INFORMATION PROCESSING SYSTEM AND INFORMATION PROCESSING APPARATUS

TECHNICAL FIELD

The present invention relates to technology for compositing and displaying images.

BACKGROUND ART

Japanese Patent Application No. JP 2003-274396A discloses technology for compositing an image according to a shooting location with a captured image and displaying the composited images. With this technology, if the shooting location is a tourist spot, for example, an image of a famous building or the like in the tourist spot is composited and displayed with a captured image.

SUMMARY OF INVENTION

An object of the present invention is to enable users to feel more enjoyment than ever by looking at compo sited images.

The present invention provides an information processing system that includes an image recognition unit configured to recognize an image and an image compositing unit configured to composite, with the image, a first composite image that varies according to a result of recognition by the image recognition unit and composite a second composite image at a predetermined position in the first composite image that is composited with the image.

The image compositing unit may composite, with the image, the first composite image that varies in at least any of appearance, size, position, motion, and number according to the result of recognition by the image recognition unit.

The image compositing unit may composite, with the image, the second composite image that varies according to the result of recognition by the image recognition unit.

The image compositing unit may composite, with the image, the second composite image that varies in at least any of appearance, size, position, motion, and number according to the result of recognition by the image recognition unit.

The image compositing unit may extract a partial image that corresponds to a head of a person from a captured image that includes the head of the person, and composite the partial image as the second composite image with the image.

The image compositing unit may composite, with the image, the second composite image that varies in direction of a face of the person or expression of the face according to the result of recognition by the image recognition unit.

The image compositing unit may composite, with the image, the second composite image that varies according to the first composite image that is to be composited.

When a category to which an object included in the image belongs is recognized by the image recognition unit, the image compositing unit may composite the first composite image according to the category at a predetermined position in the image.

When a position of an object included in the image is recognized by the image recognition unit, the image compositing unit may composite the first composite image according to the object at a predetermined position relative to the object.

The present invention also provides an information processing apparatus that includes an image compositing instruction unit configured to instruct a display apparatus to composite, with an image, a first composite image that varies according to a result of recognition of the image, and instruct the display apparatus to composite a second composite image at a predetermined position in the first composite image that is composited with the image.

According to the present invention, users can feel more enjoyment than ever by looking at composited images.

BRIEF DESCRIPTION OF DRAWINGS

FIG. 4 is a diagram showing one example of a composite image determination table that is stored in the information processing apparatus.

FIG. 5 is a block diagram showing one example of a functional configuration of the information processing system.

DETAILED DESCRIPTION

The following describes one embodiment of the present invention with reference to the drawings.

Configuration

Figure 1:
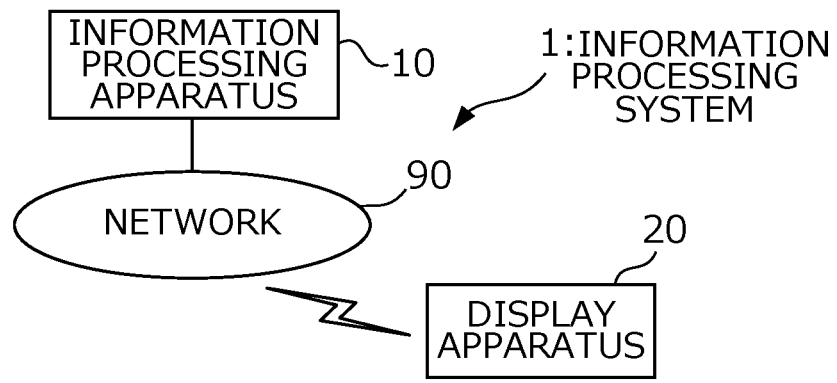
FIG. 1 is a diagram illustrating a configuration of an information processing system according to one embodiment of the present invention.

FIG. 1 is a diagram illustrating a configuration of information processing system 1 according to one embodiment of the present invention. Information processing system 1 includes information processing apparatus 10 that recognizes images, display apparatus 20 that captures and displays images, and network 90 that communicatively connects information processing apparatus 10 and display apparatus 20 to each other. Network 90 is, for example, a local area network (LAN), a wide area network (WAN), or a combination of these, and may include a wired section or a wireless section. Although FIG. 1 shows single information processing apparatus 10 and single display apparatus 20, a plurality of information processing apparatuses and/or a plurality of display apparatuses may be provided.

Information processing apparatus 10 acquires an image that is captured by display apparatus 20 and performs image recognition with respect to the captured image. Information processing apparatus 10 instructs display apparatus 20 to composite, with the captured image, a first composite image that varies according to the result of image recognition and further composite a second composite image at a predetermined position in the first composite image. For example, if landscape is captured by display apparatus 20 (FIG. 7(A) described later), a moving character image that represents a running person is composited as first composite image G1 according to the landscape (FIG. 7(B)). A predetermined position in first composite image G1, which is region G2, here, that corresponds to the head of the person represented by first composite image G1, is blank. When a user captures their face using display apparatus 20 (FIG. 7(C)), the captured image of the face is composited as second composite image G3 in region G2 of first composite image G1 (FIG. 7(D)). Thus, a moving character image that represents a running person who has the face of the user is composited with the landscape image displayed on display apparatus 20, and the user can enjoy looking at the interesting combination or motion of these images.

Figure 2:
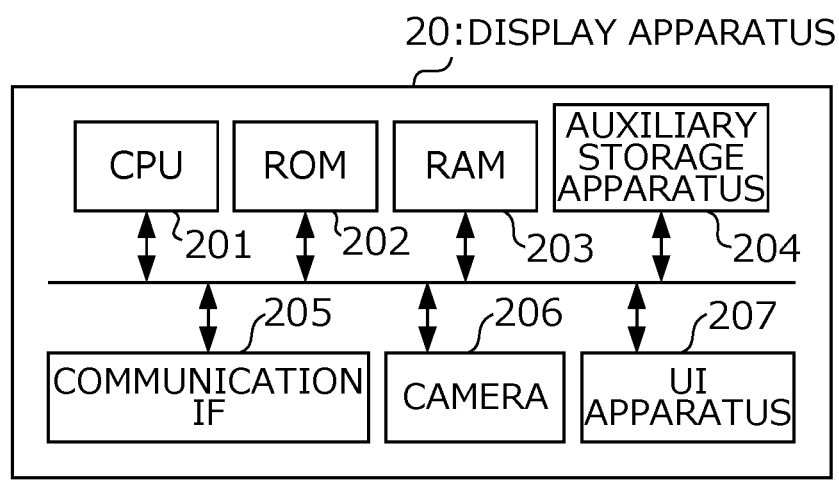
FIG. 2 is a block diagram showing one example of a hardware configuration of a display apparatus.

FIG. 2 is a diagram illustrating a hardware configuration of display apparatus 20. Display apparatus 20 is a computer that can perform communication such as a smartphone, a tablet, or a personal computer, for example. Display apparatus 20 includes central processing unit (CPU) 201, read only memory (ROM) 202, random access memory (RAM) 203, auxiliary storage apparatus 204, communication IF 205, camera 206, and UI apparatus 207. CPU 201 is a processor that performs various operations. ROM 202 is a non-volatile memory in which programs and data that are used for, for example, booting up display apparatus 20 are stored. RAM 203 is a volatile memory that serves as a work area when CPU 201 executes programs. Auxiliary storage apparatus 204 is a non-volatile storage apparatus such as a hard disk drive (HDD) or a solid state drive (SSD), for example, in which programs and data that are used in display apparatus 20 are stored. As a result of CPU 201 executing the programs, display apparatus 20 functions as a computer apparatus, and functions shown in FIG. 5, which will be described later, are realized. Communication IF 205 is an interface for performing communication via network 90 according to a predetermined communication standard. The communication standard may be a standard for wireless communication or a standard for wired communication. In the case of wireless communication, communication IF 205 includes an antenna and a communication circuit that operate according to a communication standard such as Long Term Evolution (LTE) or Wi-Fi (registered trademark), for example. Camera 206 includes lenses and optical elements and creates image data that indicates a captured image. Camera 206 includes a front camera that is provided on the front side of display apparatus 20 and a rear camera that is provided on the rear side of display apparatus 20. The front camera is mainly used when the user captures themselves and the rear camera is mainly used when the user captures landscape or the like other than themselves. UI apparatus 207 includes an operation unit that includes operators such as a key and a touch sensor, for example, a display unit that includes a liquid crystal panel and a liquid crystal driving circuit, for example, and an audio output unit such as a speaker or an earphone terminal, for example. It should be noted that display apparatus 20 may include other units such as a global positioning system (GPS) unit other than the units illustrated in FIG. 2.

Figure 3:
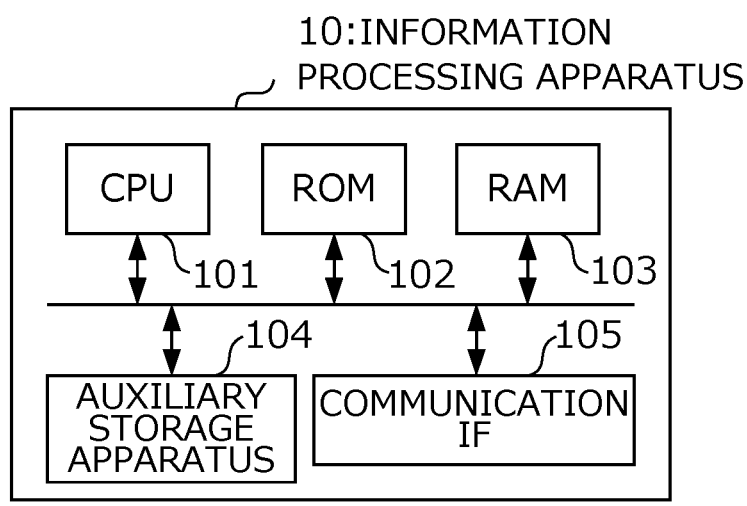
FIG. 3 is a block diagram showing one example of a hardware configuration of an information processing apparatus.

FIG. 3 is a diagram illustrating a hardware configuration of information processing apparatus 10. Information processing apparatus 10 is a computer apparatus that includes CPU 101, ROM 102, RAM 103, auxiliary storage apparatus 104, and communication IF 105. CPU 101 is a processor that performs various operations. ROM 102 is a non-volatile memory in which programs and data that are used for, for example, booting up information processing apparatus 10 are stored. RAM 103 is a volatile memory that serves as a work area when CPU 101 executes programs. Auxiliary storage apparatus 104 is a non-volatile storage apparatus such as a HDD or a SSD, for example, in which programs and data that are used in information processing apparatus 10 are stored. As a result of CPU 101 executing the programs, functions illustrated in FIG. 5 described later are realized. Communication IF 105 is an interface for performing communication via network 90 according to a predetermined communication standard. Information processing apparatus 10 may include other units such as a UI apparatus other than the units illustrated in FIG. 3.

Auxiliary storage apparatus 104 stores an image recognition engine that performs image recognition and a first composite image data group for displaying the above-described first composite image on display apparatus 20, as well as a composite image determination table for determining the first composite image to be displayed on display apparatus 20.

FIG. 4 is a diagram illustrating the composite image determination table. In the composite image determination table, recognition types of image recognition, image recognition results, first composite image IDs for identifying first composite images, and display positions of first composite images are associated with each other.

Recognition types include categorization and object detection. Categorization is also called generic object recognition and refers to only recognizing the category to which an object that is included in an image belongs or the proper noun of the object, without identifying the position of the object in the image. Categorization is realized by, for example, computing a vector quantization histogram through feature extraction of the image and applying the computation result to histograms of respective categories or proper nouns that are prepared in advance.

On the other hand, object detection is also called specific object recognition and refers to identifying the category or proper noun of an object included in an image as well as the position of the object in the image (and further the shape of the object and a boundary between the object and another object). Object detection is realized by, for example, extracting local features of the image and applying a statistical learning method to the extraction result. Information processing apparatus 10 tries to recognize an image that is captured by display apparatus 20, and as a result of the recognition, sometimes categorization can be performed, sometimes not only categorization but also object detection can be performed, and sometimes both categorization and object detection cannot be performed.

In FIG. 4, it is specified that, if an object included in an image is categorized as, for example, "bridge" as a result of image recognition performed by information processing apparatus 10, a first composite image that has a first composite image ID "C001" associated with the category or proper noun of the object is to be displayed at absolute coordinates X1, Y1 in the image. Absolute coordinates referred to here are coordinates according to X and Y coordinate axes that are defined in advance in a display region of display apparatus 20. That is, in this case, the first composite image is composited at a position (for example, a central part of the display region) that is specified using the absolute coordinates in the display region of display apparatus 20 irrespective of the position of the object, which is a "bridge", in the image.

Figure 7:
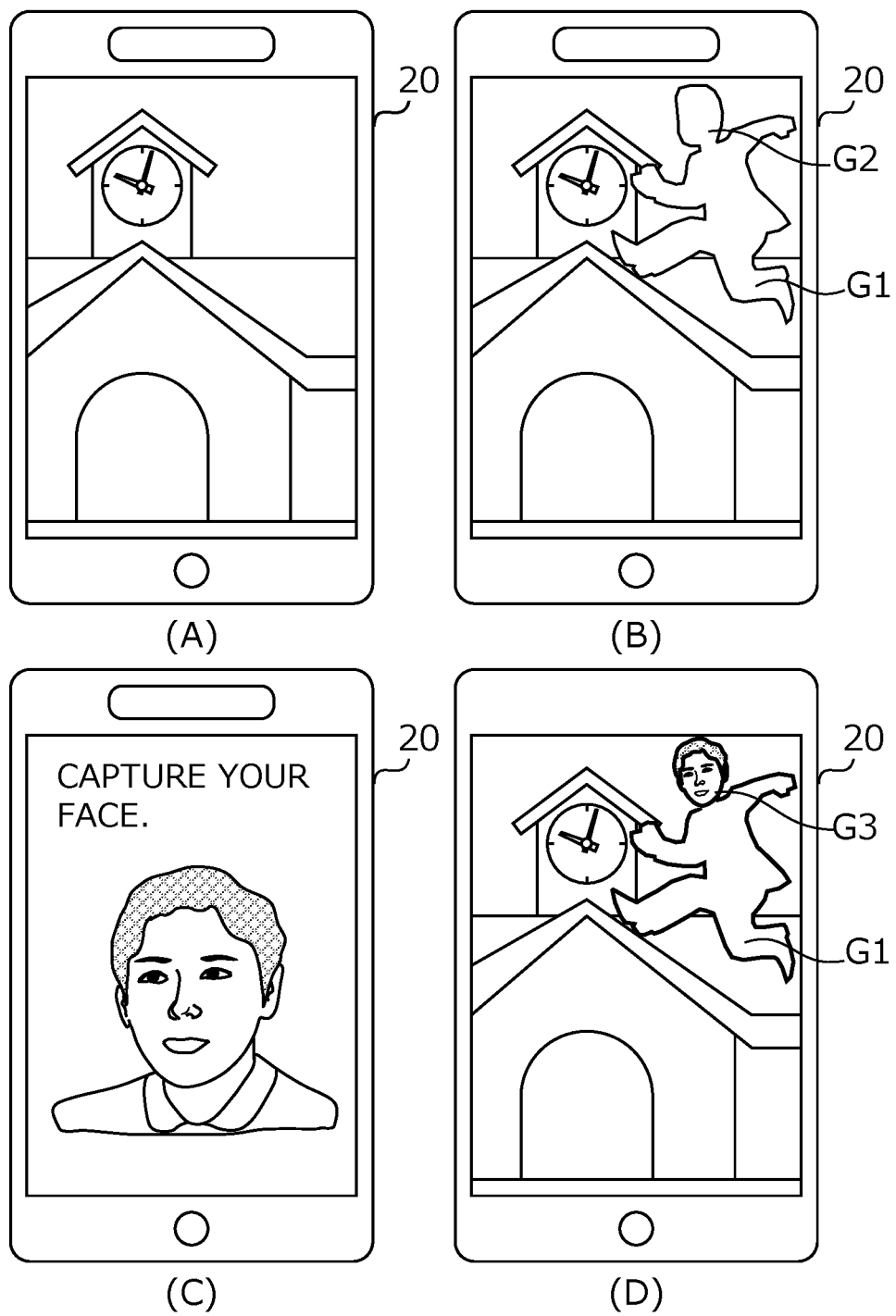
FIG. 7 is a diagram illustrating one example of the display on the display apparatus.

It is also specified that, if, with respect to an object included in an image, a category "building", a proper noun "clock tower", and the position of the object in the image are obtained through object detection as a result of image recognition performed by information processing apparatus 10, a first composite image that has a first composite image ID "C020" associated with the object (category or proper noun) is to be displayed at relative coordinates x1, y1. Relative coordinates referred to here are coordinates according to x and y coordinate axes that are defined with respect to the detected object, which is a "clock tower" (for example, x and y coordinate axes that are defined with the center of gravity of the object being set as the origin and that have a scale of a unit according to the size of the object). In this case, the first composite image is composited at a position that is specified using the relative coordinates with respect to the position of the object "clock tower" in the image, and accordingly the display position of the first composite image varies according to the position of the object "clock tower" in the image. For example, as shown in FIG. 7, first composite image G1 is always displayed at a position that is located above a roof portion of the object "clock tower" in the gravitational direction.

It should be noted that each piece of first composite image data that is stored in auxiliary storage apparatus 104 includes data that specifies the display position of the second composite image in the first composite image. For example, if a moving character image representing a running person is composited as first composite image G1 (FIG. 7(B)), first composite image data includes data that specifies, as the predetermined position, the position of region G2 corresponding to the head of the person in first composite image G1.

FIG. 5 is a block diagram showing a functional configuration of information processing system 1. As shown in FIG. 5, the followings are realized in display apparatus 20, that is, image capturing unit 21 that captures an image, second composite image acquiring unit 22 that acquires a second composite image, image data creating unit 23 that creates image data by compositing a first composite image and a second composite image with an image captured by image capturing unit 21, and display unit 24 that displays an image that corresponds to the image data created by image data creating unit 23. The followings are realized in information processing apparatus 10, that is, image recognition unit 11 that recognizes an image captured by image capturing unit 21, first composite image determination unit 12 that determines a first composite image that varies according to the result of recognition by image recognition unit 11, and image compositing instruction unit 13 that instructs display apparatus 20 to composite the first composite image that is determined by first composite image determination unit 12 with the image captured by image capturing unit 21 and composite a second composite image at a predetermined position in the first composite image that is composited with the captured image.

Image capturing unit 21 and second composite image acquiring unit 22 are realized by camera 206 of display apparatus 20, image data creating unit 23 is realized by CPU 201 of display apparatus 20, and display unit 24 is realized by UI apparatus 207 of display apparatus 20. Image recognition unit 11 is realized by CPU 101 of information processing apparatus 10, first composite image determination unit 12 is realized by CPU 101 and auxiliary storage apparatus 104 of information processing apparatus 10, and image compositing instruction unit 13 is realized by CPU 101 and communication IF 105 of information processing apparatus 10. Image compositing unit 30 that is included in information processing system 1 according to the present invention is realized by image data creating unit 23 and image compositing instruction unit 13. Image compositing unit 30 composites a first composite image that varies according to the result of recognition by image recognition unit 11 with an image captured by image capturing unit 21.

Operation

Figure 6:
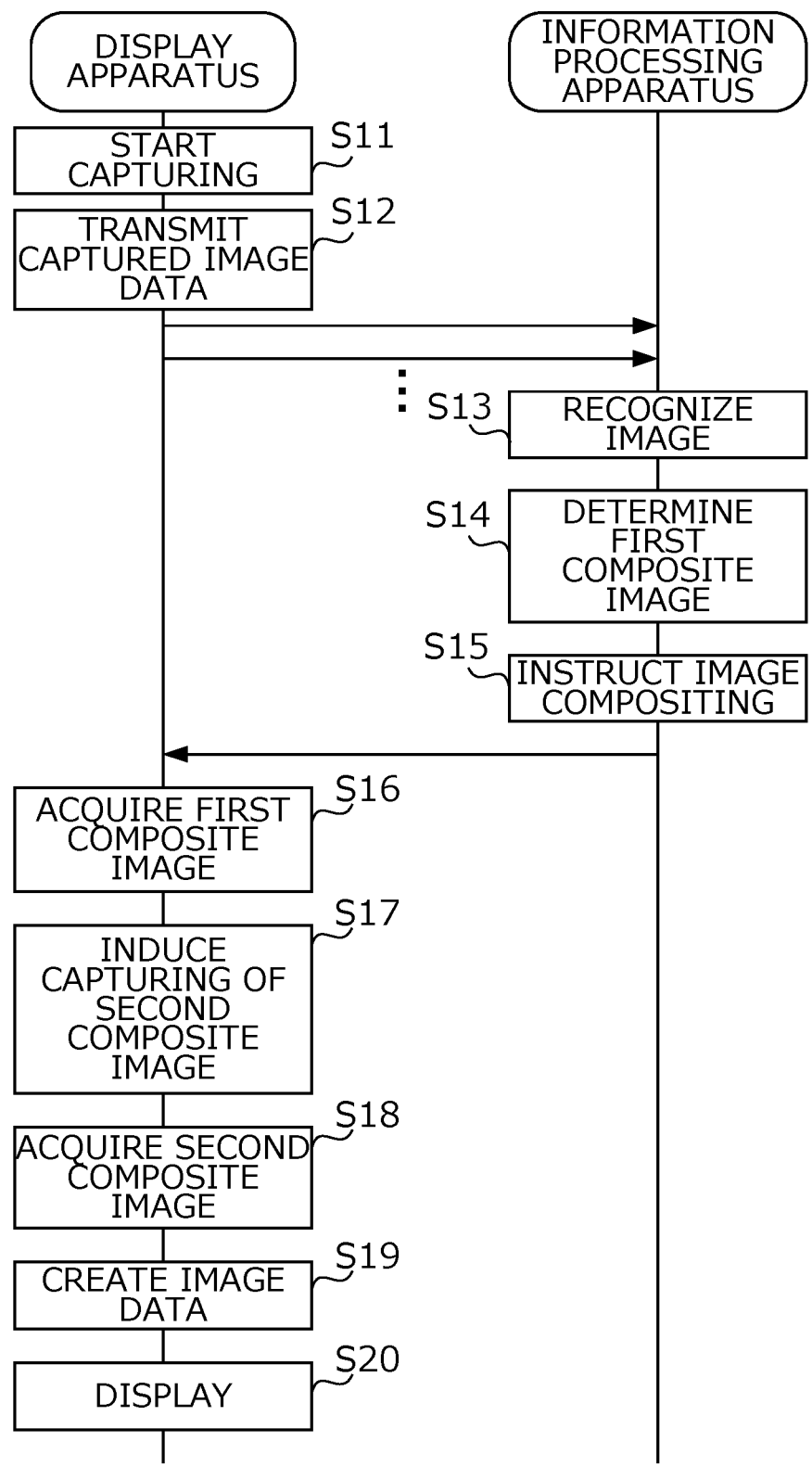
FIG. 6 is a flowchart showing one example of an operation procedure of the information processing system.

An example of display control that is performed by information processing system 1 will be described with reference to FIGS. 6 to 8. First, the user activates image capturing unit 21 (rear camera) of display apparatus 20 and starts capturing a desired object (step S11). The result of capturing by image capturing unit 21 is displayed in the display region of display apparatus 20 in real time, and if the direction of capturing by image capturing unit 21 changes, an image that is displayed in the display region also changes. For example, if the user performs a predetermined operation with display apparatus 20 pointed in a direction in which landscape including a clock tower can be captured, a captured image is displayed in the display region of display apparatus 20 as shown in FIG. 7(A). Captured image data that indicates the captured image is transmitted from communication IF 205 to information processing apparatus 10 at the time when the operation is performed by the user, or continuously or periodically from when the operation is performed (step S12). At this time, it is desirable that display apparatus 20 compresses the captured image data as appropriate to reduce the data size.

Image recognition unit 11 of information processing apparatus 10 tries to perform image recognition by applying the image recognition engine to the captured image data (step S13). If image recognition is successful, first composite image determination unit 12 determines, based on the result of recognition, a first composite image that is to be composited with the captured image by display apparatus 20 (step S14). Here, if image recognition unit 11 succeeds in categorization, first composite image determination unit 12 identifies a first composite image ID that is associated with the category of the object in the table shown in FIG. 4, and reads out first composite image data that has the first composite image ID from auxiliary storage apparatus 104. Image compositing instruction unit 13 transmits, to display apparatus 20, the read first composite image data together with absolute coordinates that are associated with the category in the table shown in FIG. 4, as an image compositing instruction (step S15). At this time, the first composite image data includes data that specifies the display position of a second composite image in the first composite image, as described above.

Alternatively, if object detection is successful, first composite image determination unit 12 identifies a first composite image ID that is associated with the category or proper noun of the object in the table shown in FIG. 4, and reads out first composite image data that has the first composite image ID from auxiliary storage apparatus 104. Image compositing instruction unit 13 transmits, to display apparatus 20, the read first composite image data together with coordinates of the object in the display region of display apparatus 20 and relative coordinates that are associated with the category or proper noun in the table shown in FIG. 4, as an image compositing instruction (step S15). At this time as well, the first composite image data includes data that specifies the display position of a second composite image in the first composite image, as described above.

Image data creating unit 23 of display apparatus 20 acquires the above-described first composite image data and the like (step S16), and then displays the first composite image at a position that is specified using coordinates (absolute coordinates or relative coordinates) on the captured image displayed by display unit 24. For example, if the user has captured landscape including a clock tower, first composite image G1, which is a moving image representing a running person, is displayed above a roof portion of the clock tower as shown in FIG. 7(B).

Then, image data creating unit 23 induces the user to capture a second composite image (step S17). This inducement can be realized by, for example, displaying a message such as "Capture your face" and specifying a capturing position of the face in the display region of display apparatus 20.

In response to this inducement, the user captures their face using image capturing unit 21 (front camera). In this case, for example, the upper half of the user's body including the face is displayed in the display region of display apparatus 20 as shown in FIG. 7(C). Image data creating unit 23 extracts a partial image that corresponds to the head of the user from this image using image recognition technology or the like, and acquires the partial image as the second composite image (step S18). Then, image data creating unit 23 creates image data by compositing the first composite image and the second composite image with the captured image (step S19), and displays an image that corresponds to the image data (step S20). As a result, the second composite image that shows the face of the user is arranged at the position of the head in the first composite image representing the running person, and these are displayed above the roof portion of the clock tower as shown in FIG. 7(D), for example.

Figure 8:
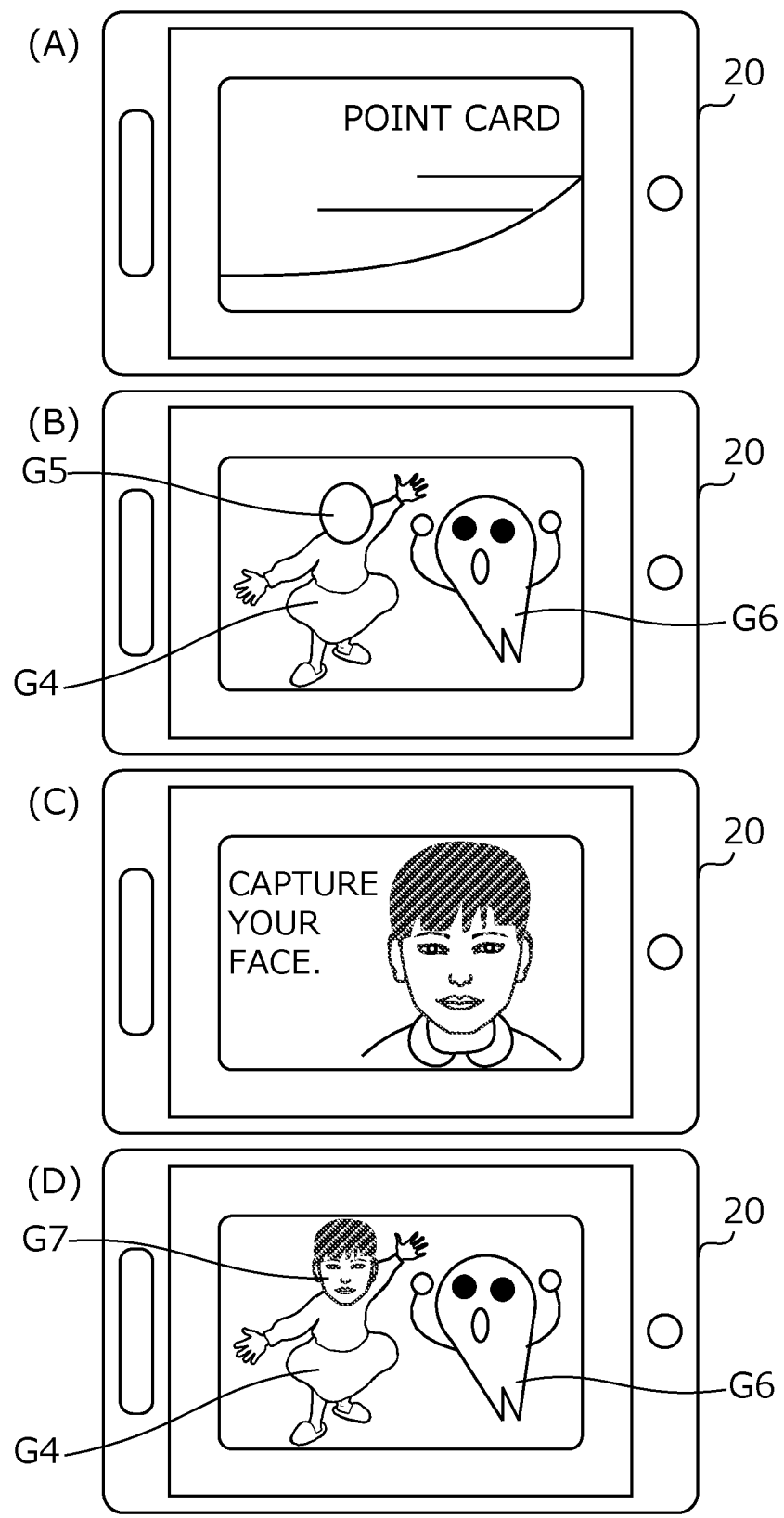
FIG. 8 is a diagram illustrating one example of the display on the display apparatus.

FIG. 8 is a diagram showing another example of the display different from the above. For example, if a point card that is issued by a company A for giving a privilege to a user is captured as an object by display apparatus 20 (FIG. 8(A)), a moving character image that represents a dancing person is composited as first composite image G4 (first composite image ID: C022 in FIG. 4) according to the object, and further, an image of an animation character who dances together with the person is composited as another first composite image G6 (first composite image ID: C023 in FIG. 4) (FIG. 8(B)). In first composite image G4, region G5 that corresponds to the head of the person is blank. When the user captures their face using display apparatus 20 (FIG. 8(C)), an image of the face of the user is composited as second composite image G7 in region G5 of first composite image G4 (FIG. 8(D)). Thus, the character image representing the person having the face of the user and the image of the animation character dancing together with the person are composited with the point card displayed on display apparatus 20, and the user can enjoy looking at the combination, arrangement, or motion of these images.

According to the embodiment described above, for example, a moving character image (first composite image) representing a running person who has the face of the user (second composite image) is composited with a captured image displayed on display apparatus 20, and the user can feel new enjoyment by looking at the combination, arrangement, or motion of these images. Since the first composite image varies according to the result of recognition of the captured image displayed on display apparatus 20, when the user captures various objects, the user can expect what kind of first composite image will be composited and enjoy the result of expectation. Further, since the image of the user's face is used as the second composite image, the user can feel as if being in a virtual space in the captured image. Also, the user captures their face as the second composite image after looking at the first composite image that is composited with the captured image, and therefore the user can change the direction or expression of their face to be composited so as to match the atmosphere of the captured image and the first composite image by looking toward one side or taking on a comical expression or a desperate expression, for example. This also adds enjoyment for the user.

Variations
Variation 1
The above-described embodiment can be varied as described below. Also, any two or more of the following variations may be implemented in combination.

Image compositing unit 30 is not limited to compositing a first composite image that varies in the appearance according to the result of recognition by image recognition unit 11, and may composite a first composite image that varies in at least any of the size, position, motion, and number, for example. Also, the first composite image is not limited to a moving image and may be a still image.

Image compositing unit 30 may composite a first composite image that varies according to an attribute of the user or the position of display apparatus 20 in addition to the result of recognition by image recognition unit 11.

It is only required that image compositing unit 30 composite a first composite image that varies according to the result of recognition by image recognition unit 11, and, if a building is captured, for example, image compositing unit 30 may recognize the plane of the ground on which the building stands and composite the first composite image on the plane.

If various elements of the first composite image vary according to the image recognition result as described above, enjoyment for the user increases.

Variation 2
In the embodiment, image compositing unit 30 always uses the image of the face that is captured by the user as the second composite image regardless of the result of recognition by image recognition unit 11, but image compositing unit 30 may composite a second composite image that varies according to the result of recognition by image recognition unit 11. For example, the user captures their face with various expressions or from various directions and stores the captured images in auxiliary storage apparatus 204 of display apparatus 20 in advance, and further the captured images are given tags that indicate states of the user (for example, cheerful, sad, smiling, crying, pretending ignorance, or expressionless) that are associated with the expressions or directions of the face. The tags may be given by the user or by display apparatus 20 or information processing apparatus 10 using image recognition technology. Image compositing unit 30 uses, as the second composite image, an image of a face that has a tag that is associated with the result of recognition by image recognition unit 11. In this case, results of recognition by image recognition unit 11 and types of states of the user are stored in association with each other in auxiliary storage apparatus 204, and image compositing unit 30 identifies a tag that is associated with the result of recognition by image recognition unit 11 and reads out image data of a face that has the tag from auxiliary storage apparatus 204. Furthermore, image compositing unit 30 may composite a second composite image that varies in at least any of the appearance, size, position, motion, and number, not limited to the facial expression as described above, according to the result of recognition by image recognition unit 11. It should be noted that the second composite image is not limited to a captured image and may be any image such as an avatar or an animation image. If various elements of the second composite image vary according to the image recognition result as described above, enjoyment for the user increases.

Variation 3
Image compositing unit 30 may composite a second composite image that varies according to the first composite image. For example, if landscape is captured by display apparatus 20, first composite image G1 according to the landscape is composited. Image compositing unit 30 proposes, for example, a plurality of second composite image candidates to the user according to first composite image G1, and composites a second composite image that is selected by the user out of the candidates.

As an example of combining a second composite image selected from a plurality of second composite images with the first composite image, if the first composite image is, for example, a moving image that represents motion and positional change of the body of a person who gradually climbs up a captured building, a second composite image that shows a face with a cheerful expression may be combined with the first composite image while the person is climbing lower floors of the building, and a second composite image that shows a face with a suffering expression may be combined with the first composite image as the person goes up to higher floors. That is, the second composite image may be changed according to motion or positional change of the first composite image.

If various elements of the second composite image vary according to the first composite image as described above, enjoyment for the user increases.

Variation 4

The first composite image data may be stored in display apparatus 20 rather than in information processing apparatus 10, and information processing apparatus 10 may merely give an instruction to display apparatus 20 as to which first composite image data is to be used, using a first composite image ID. In this case, the amount of data transmitted between information processing apparatus 10 and display apparatus 20 can be reduced.

Variation 5

The first composite image and the second composite image may be composited with not only an image that is captured by image capturing unit 21 in real time but also an image that is selected from images that were captured by image capturing unit 21 in the past and are stored in auxiliary storage apparatus 204 or an image that is acquired by display apparatus 20 from another apparatus. In this case, the user can select an image to be composited with the first composite image and the second composite image from many options.

Variation 6

The first composite image or the second composite image may be used as an advertisement.

For example, it is possible to use, as the first composite image, an image that represents a character of a manufacturer holding a pet bottle (advertisement target) sold by the manufacturer, or an image that represents the character wearing clothes on which the pet bottle (advertisement target) is illustrated at the center thereof.

Alternatively, when display apparatus 20 is held over a pet bottle (advertisement target) sold by a beverage manufacturer, an image of a character of the beverage manufacturer may be displayed as the first composite image at a position on the pet bottle, and the face of the user may be combined, as the second composite image, with the image of the character.

In another example, when display apparatus 20 is held up over a large crossing in a town, a first composite image may be composited in a region of a screen panel installed at the crossing, and a moving image that represents the advertisement target may be reproduced as a second composite image on the first composite image. In this case, it looks as if the advertisement was being reproduced in the town.

The combination of the first composite image and the second composite image may be changed according to an attribute of the user, the position of display apparatus 20, or a unit cost paid by the advertiser. Thus, the present invention can be used for advertisements.

Other Variations

The block diagrams used in the above description of the embodiment show blocks in units of functions. These functional blocks (constituent units) are realized by any combination of hardware and/or software. Furthermore, there are no particular limitations on the means for realizing the functional blocks. In other words, the functional blocks may be realized by one physically and/or logically combined apparatus, or a plurality of physically and/or logically separated apparatuses that are connected directly and/or indirectly (for example, in a wired and/or wireless manner).

The aspects/embodiment explained in the present description may also be applied to a system using Long Term Evolution (LTE), LTE-Advanced (LTE-A), SUPER 3G, IMT-Advanced, 4G, 5G, Future Radio Access (FRA), W-CDMA (registered trademark), GSM (registered trademark), CDMA2000, Ultra Mobile Broadband (UMB), IEEE 802.11 (Wi-Fi), IEEE 802.16 (WiMAX), IEEE 802.20, Ultra-Wide Band (UWB), Bluetooth (registered trademark) or another appropriate system, and/or an extended next-generation system that is based on them.

The order in the processing procedure of the embodiment described in the present description may be changed as long as no contradictions arise. For example, the methods explained in the present description show various step elements in an exemplified order, and are not limited to the specific order that is shown. The embodiment or variations described in the present description may also be used alone or in combination, or may also be switched when they are implemented. Furthermore, the notification of predetermined information (e.g., notification of "being X") is not limited to being performed explicitly, and may also be performed implicitly (for example, notification of the predetermined information is not performed).

The terms "system" and "network" used in the present description can be used in an interchangeable manner.

The term "determining" used in the present description may include various types of operations. The term "determining" can include a case where judging, calculating, computing, processing, deriving, investigating, looking up (for example, looking up a table, a data base, or another data structure), or ascertaining is regarded as "determining". Furthermore, the term "determining" can include a case where receiving (for example, receiving information), transmitting (for example, transmitting information), inputting, outputting, or accessing (for example, accessing data in the memory) is regarded as "determining". Furthermore, the term "determining" can include a case where resolving, selecting, choosing, establishing, or comparing is regarded as "determining". In other words, the term "determining" can include a case where some operation is regarded as "determining".

The phrases "based on" and "according to" used in the present description do not mean "only based on" and "only according to" unless otherwise stated. In other words, the phrase "based on" can mean both "only based on" and "at least based on". Similar can be said for "according to". The terms "including", "comprising", and other forms thereof are intended to be comprehensive as long as they are used in the present description or the claims, similar to the term "being provided with". Furthermore, the term "or" used in the present description or the claims is intended not to be exclusive OR. In the entirety of the present disclosure, when articles are added through translation, for example, as "a", "an", and "the" in English, these articles also denote the plural form unless it is clear otherwise from the context.

Regardless of whether software is called software, firmware, middleware, microcode, hardware description language, or any other name, it should be widely interpreted to mean instruction, instruction set, code, code segment, program code, program, subprogram, software module, application, software application, software package, routine, subroutine, object, executable file, execution thread, procedure, function, and the like.

Software, instructions, and the like may also be transmitted/received via a transmission medium. For example, if software is transmitted from a web site, a server, or another remote source using a wired technology such as a coaxial cable, an optical fiber cable, a twisted-pair wire, or a digital subscriber line (DSL), and/or a wireless technology using infrared light, radio waves, microwaves, or the like, the definition of the transmission medium will include the wired technology and/or the wireless technology.

The terms "connected" and "coupled", or any other forms thereof mean any type of direct or indirect connection or coupling between two or more elements, and can include a case where one or more intermediate elements are present between two elements that are "connected" or "coupled" to each other. The elements may be subjected to physical coupling or connection, logical coupling or connection, or a combination of physical and logical coupling/connection. Two elements, when used in the present description, can be thought of as being "connected" or "coupled" to each other by using one or more wires, cables, and/or printed electric connections, and using electromagnetic energy such as electromagnetic energy having a wavelength in a radio frequency range, a micro wave range, and a light (both visible light and invisible light) range, as some non-limiting and incomprehensive examples.

The information processing apparatus according to the present invention can be realized by an apparatus that integrally has all functions as described in the embodiment, or may be a system in which functions of apparatuses are further distributed into a plurality of apparatuses.

The present invention can be carried out as an information processing method that is performed by display apparatus 1 or a program for causing a computer to function as display apparatus 1. This program may be provided in a mode of being recorded on a recording medium such as an optical disk, or may be provided in a mode of being downloaded to a computer via a network such as the Internet and being installed in the computer to become usable, for example. Regardless of whether this program is called software, firmware, middleware, microcode, hardware description language, or any other name, it should be widely interpreted to mean instruction, instruction set, code, code segment, program code, program, subprogram, software module, application, software application, software package, routine, subroutine, object, executable file, execution thread, procedure, function, and the like.

REFERENCE SIGNS LIST

1 Information processing system
10 Information processing apparatus
11 Image recognition unit
12 First composite image determination unit
13 Image compositing instruction unit
20 Display apparatus
21 Image capturing unit
22 Second composite image acquiring unit
23 Image data creating unit
24 Display unit
90 Network
101 CPU
102 RAM
103 ROM
104 Auxiliary storage apparatus
105 Communication IF
201 CPU
202 ROM
203 RAM
204 Auxiliary storage apparatus
205 Communication IF
206 Camera
207 UI apparatus

What is claimed is:

1. An information processing system comprising:
an image recognition unit configured to:
  recognize an image; and
an image compositing unit configured to:
  composite, with the image, a first composite image that varies according to a result of recognition of the image by the image recognition unit;
  extract from a captured image a partial image as a second composite image that corresponds to a head of a person that includes the head of the person; and
  composite the second composite image at a predetermined position in the first composite image that is composited with the image;
  wherein the second composite image varies in at least any of appearance, size, position, motion, and number according to the result of recognition of the image by the image recognition unit; and
  wherein the second composite image varies in direction of a face of the person or expression of the face according to the result of recognition of the image by the image recognition unit.

2. The information processing system according to claim 1, wherein the first composite image varies in at least any of appearance, size, position, motion, and number according to the result of recognition of the image by the image recognition unit.

3. The information processing system according to claim 1,
  wherein the second composite image varies according to the first composite image that is to be composited.

4. The information processing system according to claim 1,
  wherein when a category to which an object included in the image belongs is recognized by the image recognition unit, the image compositing unit is further configured to composite the first composite image according to the category at a predetermined position in the image.

5. The information processing system according to claim 1,
  wherein when a position of an object included in the image is recognized by the image recognition unit, the image compositing unit is further configured to composite the first composite image according to the object at a predetermined position relative to the object.

6. An information processing apparatus comprising:
an image compositing instruction unit configured to:
  instruct a display apparatus to composite, with an image, a first composite image that varies according to a result of recognition of the image;
  extract from a captured image a partial image as a second composite image that corresponds to a head of a person that includes the head of the person; and
instruct the display apparatus to composite the second composite image at a predetermined position in the first composite image that is composited with the image;
  wherein the second composite image varies in at least any of appearance, size, position, motion, and number according to the result of recognition of the image; and
  wherein the second composite image varies in direction of a face of the person or expression of the face according to the result of recognition of the image.

7. An information processing system comprising:
a first processor configured to:
  recognize an image; and a second processor configured to:
  composite, with the image, a first composite image that varies according to a result of recognition of the image by the first processor;
  extract from a captured image a partial image as a second composite image that corresponds to a head of a person that includes the head of the person; and
  composite the second composite image at a predetermined position in the first composite image that is composited with the image;
  wherein the second composite image varies in at least any of appearance, size, position, motion, and number according to the result of recognition of the image by the first processor; and
  wherein the second composite image varies in direction of a face of the person or expression of the face according to the result of recognition of the image by the first processor.

* * * * *